United States Patent [19]
Wolff

[11] 3,862,358
[45] Jan. 21, 1975

[54] VISUAL SIMULATION SYSTEM
[75] Inventor: Hanns H. Wolff, Orlando, Fla.
[73] Assignee: The United States of America as represented by the Secretary of the Navy, Washington, D.C.
[22] Filed: Sept. 21, 1973
[21] Appl. No.: 399,564

Related U.S. Application Data
[63] Continuation-in-part of Ser. No. 195,637, Nov. 4, 1971, abandoned.

[52] U.S. Cl............ 178/6.8, 178/DIG. 35, 35/10.2, 35/11
[51] Int. Cl. ............................................ H04n 7/18
[58] Field of Search ....... 178/DIG. 35, 6.8; 35/10.2, 35/11

[56] References Cited
UNITED STATES PATENTS
2,855,701  10/1958  Roos .................................. 35/10.2
3,486,242  12/1969  Aronson ...................... 178/DIG. 35
3,584,397  6/1971   Woodcock ............................. 35/11

*Primary Examiner*—Howard W. Britton
*Attorney, Agent, or Firm*—Richard S. Sciascia; Don D. Doty; Harvey A. David

[57] ABSTRACT

A visual simulation system is described that provides a composite television display having a background image that changes in accordance with computed movements of a simulated vehicle and an inserted foreground image that is characterized by relative movement between it and the background image in response to changes in point of view by an observer. Computation of the amount of shift necessary for changing vehicle positions and headings is also described.

9 Claims, 7 Drawing Figures

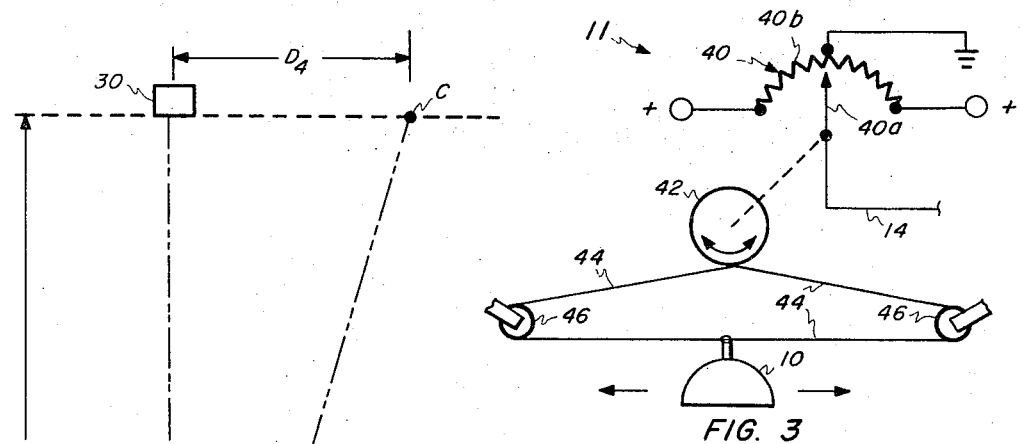
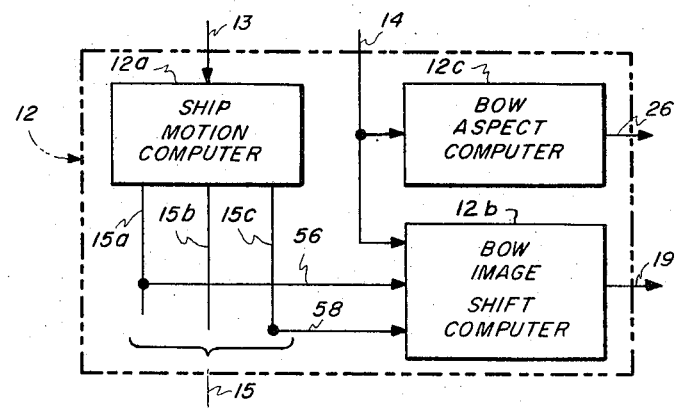
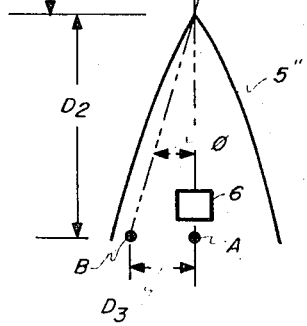
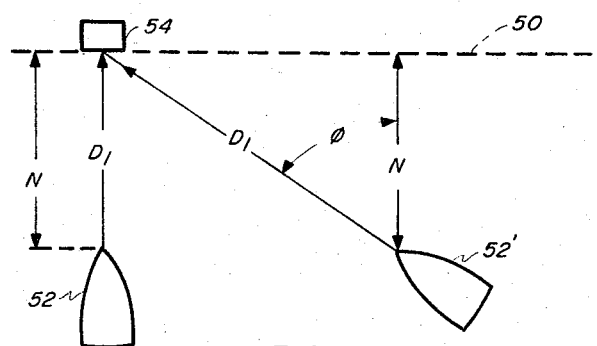
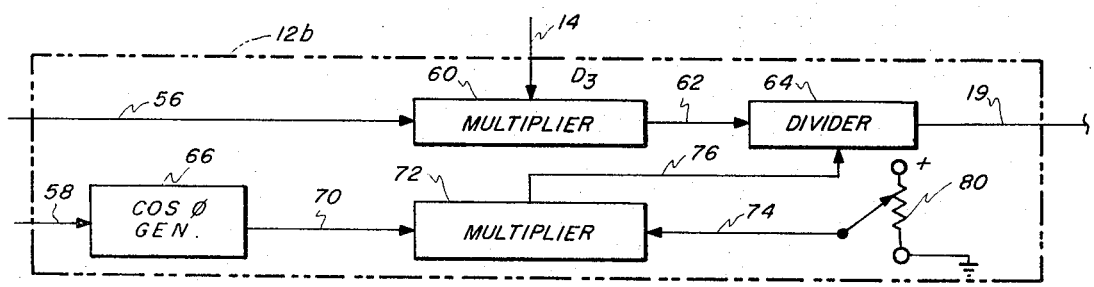
FIG. 2
FIG. 3
FIG. 4
FIG. 5
FIG. 6

VISUAL SIMULATION SYSTEM

STATEMENT OF GOVERNMENT INTEREST

The invention described herein may be manufactured and used by or for the Government of the United States of America for Governmental purposes without the payment of any royalties thereon or therefor.

CROSS-REFERENCE TO RELATED APPLICATION

This application is a continuation-in-part of applicant's application Ser. No. 195,637, filed Nov. 4, 1971, assigned to the assignee hereof, and now abandoned.

FIELD OF THE INVENTION

This invention relates to simulation systems for training purposes, and more particularly to a visual simulation system for training operators of steerable, moving platforms such as ships or other vehicles. In certain platform control operations the operator or person in command moveds his head to observe parallax and thereby estimate the distance from his platform from another object. For example, a ship conning officer shifts his head or walks from place to place on the bridge. Since he knows the distance of the bow of his ship from his position, the change of his line of sight allows him to estimate the distance to a pier.

DISCUSSION OF THE PRIOR ART

Various devices have been proposed in the past wherein a student boat helmsman or ship conning officer is trained by viewing a scene that changes in accordance with actuation of various controls of a simulated bridge, steering station, or the like. Examples of such devices may be found in U.S. Pat. No. 2,855,701 to Paul A. Roos, U.S. Pat. No. 3,486,242 to Moses Aronson, and U.S. Pat. No. 3,584,397 of Albert E. Woodcock. While these patents each represent improvements in simulation techniques for training of students in vessel conning, none provides a near or foreground scene, such as one representing the forward portions of a ship, that experiences relative movement between it and a distant or background scene, such as one representing ship docks, in response to lateral movements of a student observer of the scene and in accordance with the parallax that would be observed in an actual situation.

Some degree of distance judgment can, of course, be made from the sizes of objects in the scenes viewed in the prior art devices. However, the lack of parallax effects in the scenes viewed with those devices prohibits accurate simulation, for example of the real life situation wherein the bow of a ship is used as the feature relative to which the observer views the background scene. The amount of parallax that occurs in a real situation is a function not only of the lateral displacement of the observer's eyes, but also of the distance from the observer to the bow, and the distance from the bow to the background objects. The latter two distances are quite substantial, and the distance from the ship bow to the observed background objects changes with movements of the ship in approaching its berth, for example. Accordingly, it is desirable that a trainer of the type concerned be capable of including parallax among the visual cues that a student may learn to use in conning or steering a vehicle.

SUMMARY OF THE INVENTION

The present invention aims to overcome most or all of the disadvantages of the prior art, especially relating to the visual simulation of parallax effects, through the provision of novel combinations of elements and arrangements of parts that result in the presentation of a composite television type display wherein a background image and an inserted foreground image experience relative movements as a function of various simulated distances between an observer and the objects in the composite scene observed.

With the foregoing in mind, it is a principal object of this invention to provide an improved visual simulation system that is particularly well adapted to application in training devices.

Another object of the invention is the provision of a visual simulation system utilizing composite scene projection techniques, and wherein relative movement between foreground and background objects in a scene are effected in response to lateral positional changes of an observers eyes so as to accurately simulate parallax effects although both the foreground and the background scenes are projected on the same plane or curved screen.

Yet another object of this invention is the provision of a visual simulation system of the foregoing character in a training device having a simulated vehicle control station, and wherein the projected background and foreground scenes are automatically modified in accordance with simulated progress of the vehicle in response to manipulation of controls at the control station, and also in accordance with changes in positions of a student point of observation in viewing the scene.

Still another object is the provision of such an improved visual simulation system wherein the student or other observer is relatively free to change his point of view and yet such changes are automatically utilized to introduce the aforementioned desired parallax effects, whereby a particularly useful and realistic degree of simulation of a selected environment is achieved.

A further object is to accomplish the foregoing in a reliable and inexpensive manner through novel and unobvious combinations of elements that are readily available and known to those skilled in the art to which the invention pertains.

Other objects and many of the attendant advantages will be readily appreciated as the subjected invention becomes better undersstood by reference to the following detailed description, when considered in conjunction with the accompanying drawings.

BRIEF DESCRIPTION OF THE DRAWINGS

FIG. 2 is a graphic illustration of certain principles involved;

FIG. 3 is a diagrammatic illustration of a sensor portion of the of FIG. 1;

FIG. 4 is a diagrammatic illustration of the computer of FIG. 1;

FIG. 5 is a graphical illustration of further principles utilized in the in invention;

FIG. 6 is a more detailed diagrammatic illustration of a section of the computer of FIG. 4; and FIG. 7 is a diagrammatic illustration of an alternative sensor portion of the system of FIG. 1.

DESCRIPTION OF THE PREFERRED EMBODIMENT

Figure 1:
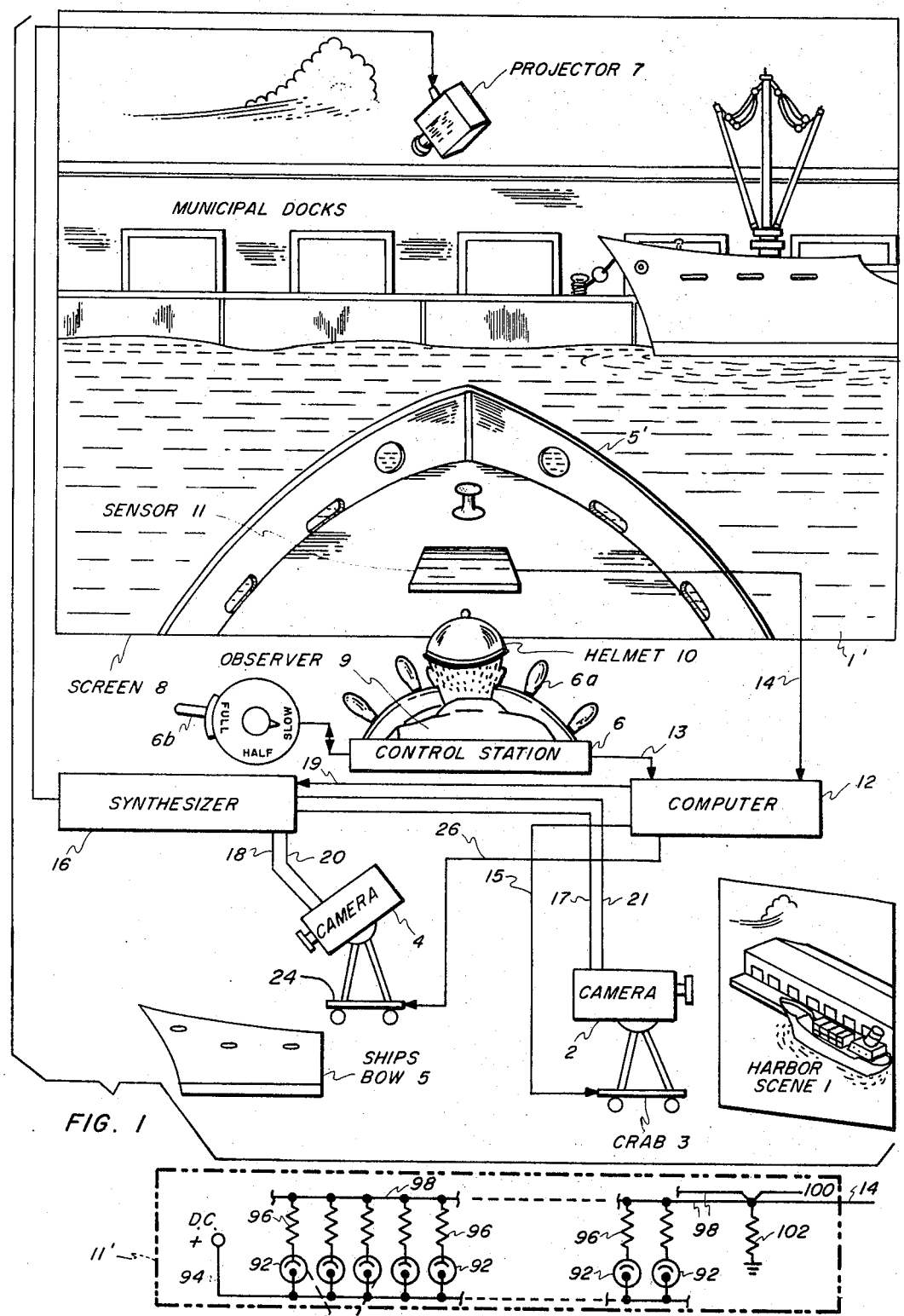
FIG. 1 is a diagrammatic illustration, partly in block form, of a visual simulation system embodying the invention.

In the form of the invention illustrated in the drawings and described hereinafter by way of example, a visual simulation system is provided that is adapted to the training of ship conning officers in the docking of a ship. With reference now to FIG. 1, there is provided a three-dimensional model of a background scene, for example a harbor scene, generally indicated at 1. Background scene 1 is observed or viewed by a first television camera 2 which is carried by a movable platform which may be in the form of a driven carrier or crab 3. Crab 3 may be any suitable type known in the art to which the invention pertains. The details of the carrier per se for camera 2 are not important. Suffice it to say that the carrier or crab must be capable of moving camera 2 with respect to background scene 1 in accordance with progress of a simulated, or math model, ship. The use of a camera crab in such a manner is exemplified by the earlier mentioned U.S. Pat. No. 3,486,242.

A second television camera 4 views or observes a two or three-dimensional model of a foreground scene, for example a ship's bow 5. Camera 4 is located in a position corresponding to the eye location, or point of view, of an observer on the bridge of the ship having bow 5.

A control station 6 is provided having various simulated controls including a simulated steering control represented by wheel 6a, simulated engine order or speed control 6b, and other controls, such as for signals or the like, suitable to operation of a ship. The controls 6a, 6b control, through a computer and suitable servo drive system of a type well known in the art concerned and later discussed in more detail, the position of crab 3 and camera 2 thereon with respect to background scene 1.

A television projector system 7 and a preferably spherical, or otherwise curved screen 8 are provided to display to a student or observer 9 a composite, enlarged scene derived from the two cameras 2 and 4. The composite scene includes a projected harbor scene as a background image 1' and a ship's bow image 5' inserted therein. Images 1' and 5' experience relative movements therebetween, in a manner which will presently be made apparent, in response to movements of the point of view of observer 9, thereby providing a realistic simulation of parallax as an aid to learning all of the visual cues normally used by a conning officer.

To this end, observer 9 carries a helmet or other head gear 10 which is linked to a sensor 11 that senses the head position, or point of view, of the observer as he shifts his viewing position from the centerline of his platform. The nature of head gear 10 and the associated sensor 11 will be dealt with more specifically hereinafter with reference to FIGS. 3 and 7.

A computer 12 is provided that receives signals from control station 6, as shown by flow line 13, and receives signals from sensor 11 of the head position, or view point of observer 9, as shown by line 14. Computer 12, the nature of which will be discussed more fully at this specification proceeds, is responsive to the inputs from control station 6, as represented by line 13, to control, via position and heading output signals represented collectively by line 15, the position and motion of crab 3 and camera 2 with respect to background scene 1.

A television picture synthesizer 16 is provided that receives background scene video signals from television camera 2 via line 17, and also receives foreground or ship's bow scene video signals from camera 4 as shown by line 18. The picture synthesizer 16 may comprise any one of several known circuits for combining video signals from a plurality of television cameras so that a foreground image derived from one camera is inserted in the display of a background image from another camera. U.S. Pat. No. 3,612,761, 3,420,953 and 3,429,454 are examples of such a technique.

In the embodiment of the invention now being described, the location of the insertion of the foreground or ship's bow image 5' into the background image 1' is controlled in accordance with the point of view of the observer 9, while the background image 1' is controlled in accordance with simulated ship speed and steering control inputs. Thus, from information signals received, as shown by line 14, from sensor 11, and from control station 6, as shown by line 13, computer 12 computes respectively the appropriate insertion position for image 5' and the appropriate position for camera 2 to develop the background scene image 1'. Computer 12 furnishes bow image position signals, as shown by line 19, to synthesizer 16 representative of the computed insertion positions of bow image 5' in background harbor image 1'. Synthesizer 16, which is interconnected with cameras 2 and 4 for the transmission of sync signals therebetween as shown by lines 21 and 20, respectively, positions the inserted image 5' in response to signals on line 19, such as by introducing appropriate sync signal delays as taught by U.S. Pat. Nos. 3,612,761 and 3,420,953 or by adjusting deflection voltage or current bias as taught by U.S. Pat. No. 3,479,454.

As an additional desirable feature, camera 4 may be carried by a driven carrier or crab 24, similar to crab 3. Crab 24 is positionable relative to bow 5 by signals, as shown by line 26 from computer 12, that are derived by the computer from the input signals thereto from sensor 11. The purpose of this is to provide a bow image 5' that changes in apparent aspect as the point of view of observer 9 changes.

Referring now to FIG. 2, there is provided graphic illustration of certain aspects of the simulation that are contemplated by the invention. Thus, consider in that Figure an observer having his eye or point of view at A, substantially on the centerline of a ship having a bow 5'' and viewing a distant background object 30 directly ahead. To that observer, the bow 5'' will appear in his view directly in line with the object. Consider also that the distance from the bow to the object plane is $D_1$ and the distance from point A to the bow is $D_2$. Now, if the observer moves himself or his head laterally a distance $D_3$ to have a new view point at B, his line of sight 32 directly over the bow will make and angle $\theta$ with the previous line of sight and the bow will appear in his field of vision to be in line with a point C on the background plane. This point C will be at a distance of $D_4$, from the object 30. This effect is known, of course, as parallax and is useful to a conning officer in the judgement of distances. It will be noted at this point that in the present example only the lateral point of view changes, represented by $D_3$, contribute materially to the parallax. The invention contemplates, however, that in other simulation uses than a ship docking trainer, other positional changes than lateral ones will be represented by appropoariate image shifts.

The actual distance $D_4$, which is to be represented by shifting of bow image 5' with respect to the background image 1' on screen 8, can readily be computed from the relationship $D_4 = D_1 D_3/D_2$. In this implementation of the invention, computer 12 musts generate a signal, to be applied as shown by line 19, in a form that can be utilized by the synthesizer to develop the necessary bow image 5' shifting sync signal delays or bias changes. This form comprises in the preferred embodiment, a D.C. voltage signal applied to a variable delay, such as element 12 of the mentioned U.S. Pat. No. 3,612,761.

Referring now to FIG. 3, which shows a first form of position sensor, lateral movements of the helmet 10 associated with change of point of view by observer 9 are readily converted to electrical analog voltage signals representative of distance $D_3$ by a sensor 11 comprising a potentiometer 40. Potentiometer 40 has its wiper 40a connected through suitable mechanical means such as a drum 42, cable 44, and sheaves 46, to be positioned in response to movements of helmet 10. The potentiometer resistor 40b has its center point grounded and opposite ends provided with a suitable source of voltage so that the wiper 40a picks off a voltage analogous of the observer's point of view to one side or the other of a center position aligned with the control station 6.

Referring now to FIG. 4, the computer 12 will be described in more detail. Computer 12 conveniently comprises several sections, a ship motion computer section 12a for providing signals, a bow position signal computer section 12b, and if desired, a bow aspect signal computer section 12c. Computer section 12a, which provides outputs represented by line 15 to crab 3, may comprise any of several well known computers for converting inputs such as from steering control 6a and speed control 6b to positioning signals as a function of ship motion factors such as rudder and speed responses. These, of course, differ from ship to ship. Satisfactory computers for this purpose include electrical analog computers such as the Reac 550, built by Reeves Instrument Co. and referred to in the mentioned patent to Aronson. Alternatively, computer section 12a may be of the electromechanical type described in detail in the mentioned Roos patent which provides first and second orthogonal coordinate outputs such as North-South, East-West, and also provides a ship's heading output in response to simulated ship steering and speed controls. In doing so computer 12 takes into consideration the particular response characteristics of a selected ship being simulated. By positioning crab 3 and its camera 2 instead of a ship model by those outputs, represented in FIG. 4 by lines 15a, 15b, and 15c, respectively, the image 1' will provide a background scene that changeds in a realistic manner as though viewed by a person on a ship responding to the simulated controls.

Computer section 12b is required to provide, as its output 19, a signal, such as an analog voltage signal, that is representative of the apparent relative shift $D_4$ between the bow 5 and the background scene due to parallax when the observer moves a lateral distance $D_3$. To do this, distance $D_1$ to an object directly ahead of the ship must continually be computed as the simulated ship changes position and heading. Referring to FIG. 5, consider the background scene to lie substantially in a selected plane 50, and a simulated ship 52 to be at a distance N taken normal to the shoreline plane 50 and to be headed directly toward shore. With an appropriately set up simulator one of the outputs, such as 15a from computer section 12a, can be taken directly as analogous of the distance $D_1$ from ship 52 to an object 54 viewed dead ahead thereof.

Now consider a simulated ship 52' to have the same position coordinate N as ship 52 but having a different second coordinate position along the shore and heading that differs from the normal to the shore by an angle $\phi$ so as to also be headed toward object 54. The distance $D_1$ from ship 52' may be expressed as:

$$D_1 = N/\cos \phi$$

Eq. 2

Combining Equations 1 and 2, the parallax shift $D_4$ for a given point of view shift $D_3$ may be expressed as:

$$D_4 = N D_3/D_2 \cos \phi$$

Eq. 3 which is implemented by computer section 12b. To this end, the first coordinate output N on line 15a from computer section 12a is applied as shown by line 56 as one input to section 12b, while the heading output on line 15c is applied as shown by line 58 as a second input thereto. The output 14 of sensor 11, representing distance $D_3$ is applied as a third input to computer section 12b.

Referring to FIG. 6, a convenient construction for computer section 12b is seen to comprise a multiplier 60 that combines a voltage or other signal representative of normal distance N, applied as shown by line 56 to multiplier 60, and a voltage or other signal representative of $D_3$, applied as shown by line 14 to the multiplier. Multiplier 60 provides, via line 62, a voltage or other signal representative of the product of $D_1$ and $D_3$ to a divider 64. The ship's heading signal, represented by line 58, is fed to a cos $\phi$ generator 66 where, for example, the ship's heading signal is a shaft position, generator 66 may conveniently comprise a potentiometer with a resistor configured to provide a voltage analogous of cos $\phi$. This signal, represented by line 70, is applied as one input to a second multiplier 72. A signal corresponding to distance $D_2$ is fed, as shown by line 74, as a second input to multiplier 72 to provide an output $D_2 \cos \phi$ via line 76 as the divisor in divider 64. A potentiometer 80, connected across a suitable voltage source, permits adjustment of the distance $D_2$ to be simulated, whereby the system can readily be adjusted to represent ships of different sizes. Divider 64 operates to provide, as an output on line 19, the desired bow image shifting signal analogous of $D_4$. The signal on line 19 is then utilized by synthesizer 16 to shift the position of the bow image 5' with respect to the background image 1' the appropriate amount for the simulated ship position, heading, and the amount of movement of the point of view of the observer 9.

If it is desired to simulate changing aspect of bow 5 due to movement of the point of view of observer 9 by the distance $D_3$, a suitable signal, represented by line 26, is derived by section 12c of computer 12 from the sensor signal on line 14. This derivation may comprise more conversion of the voltage signal on line 14 into a form useable to position crab 24 and camera 4 thereon.

The invention further contemplates that other refinements may be included in a visual simulated embodying the invention. For example, camera 2 can be automatically caused to tilt downwards proportionally as it approaches harbor scene 1 to simulate the elevated viewpoint of observer 9.

Various alternatives are available to those skilled in the art to which the invention pertains. For example, and with reference to FIG. 7, an alternative form of helmet and sensor arrangement may be utilized to derive an analog voltage signal representative of $D_3$. This alternative arrangement permits the trainee greater freedom of motion, being free of mechanical connection between the helmet and the sensor. In this embodiment a helmet 10', or other gear attached to the trainee, carries an upwardly directed light source 90 and a sensor 11' comprises a plurality of light responsive devices or photo-cells 92. Photo-cells cells 92 are arranged in one or more horizontal rows, only one of which is illustrated for the sake of clarity, extending laterally over the trainee's position.

Photo-cells 92 have their anodes supplied with a suitable D.C. voltage via a common supply line 94. Each of the photo-cells 92 has its cathode connected through a resistor 96 and a common line 98 to a summing point 100 at one end of a summing resistor 102. Resistors 96 are of diminishing ohmic values going from the center of the row of photo-cells to the extremities thereof.

The light source 90 provides a light beam 104 that has sufficient spread to cause light to impinge on more than one of the photo-cells at a time, whereby changes in current flow in line 98 and resistor 102 due to lateral movements of the trainee are smooth and progressive. As the trainee moves from a center position toward either end of the sensor 11', a corresponding increase in current flow occurs in resistor 102. There results an accompanying change in voltage at point 100 that may be applied via line 14 to computer 12. It will be understood, of course, that a number of rows of photo-cells 92, and lines 98 associated therewith, extend parallel to the row illustrated. All of the lines 98 connect with the summing point 100, whereby a trainee is not limited to purely lateral changs in point of view.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A visual simulation system for providing on a viewing screen a composite scene including a background image and a foreground image that experience relative movements in response to movements of an observer's point of view so as to simulate parallax, said system comprising:
   first and second television cameras respectively viewing background and foreground scenes;
   television projection means, coupled to said first and second television cameras for producing said images on said screen;
   synthesizer means, connected to said television cameras and to said projection means, for inserting said foreground image into said background image, said synthesizer being responsive to image positioning signals for determining azimuthal relation between said foreground image and said background image;
   sensor means, disposed in predetermined relation to said screen, for providing observer position signals that are representative of an observer's changing point of view of said screen;
   image shift computer means, connected to said sensor means and responsive to said observer position signals, for providing said image positioning signals as a function at least of said observer's point of view.

2. A visual simulation system as defined in claim 1, and further comprising:
   a simulated vehicular platform control station disposed in predetermined relation to said screen and including steering control means for generating steering signals;
   vehicular platform motion computer means, connected to said control station and responsive to said steering signals, for providing first television camera positioning signals and heading signals;
   positioning means, connected to said first television camera and responsive to said positioning and heading signals, for moving said first television camera with respect to said background scene whereby said background image changes in accordance with simulated positional coordinates and heading movements of a vehicular platform.

3. A visual simulation system as defined in claim 2, and wherein:
   said image shift computer means is also responsive to said first television camera positioning signals and said heading signals to provide said image positioning signal as a function of said simulated movements of said vehicular platform as well as of said observer's point of view.

4. A visual simulation system as defined in claim 3, and wherein:
   said sensor means comprises means adapted to be mechanically coupled to an observer.

5. A visual simulation system as defined in claim 4, and wherein said image shift computer comprises:
   first multiplier means, responsive to said observer position signals and to said first camera positioning signals, to provide first product signals;
   cosine generator means, responsive to said heading signals, for generating cosine signals representative of cosines of the angles by which said headings vary from a predetermined heading;
   means for providing foreground distance signals representative of a simulated distance between said observer and said foreground image;
   second multiplier means, responsive to said cosine signals and to said foreground distance signals to provide second product signals; and
   divider means, responsive to said first and second product signals for providing said image positioning signals.

6. A ship conning simulator apparatus for providing on a viewing screen a composite scene including a background image including presentations of a plurality of distant objects and a ship bow image inserted into said background image and shiftable with respect thereto in response to changes in point of view of an observer so as to simulate parallax, said apparatus comprising:
   a simulated ship control station disposed in predetermined relation to said screen and including speed and steering control means for generating speed and steering control signals;

a simulated background scene;

a simulated ship bow;

a first television camera viewing said simulated background scene;

a second television camera viewing said simulated ship bow;

television projection means for projecting said composite image on said screen;

television video synthesizer means, connected to said first and second television cameras, and to said projection means, for inserting said ship bow image into said background image, said synthesizer being responsive to bow image positioning signals for determining azimuthal positioning of said bow image within said background image;

sensor means, disposed in predetermined relation to said screen and to said simulated control means, for providing observer position signals that are representative of an observer's laterally changing point of view;

ship motion computer means, responsive to sid speed and steering signals to provide simulated ship position and heading signals;

first camera positioning means, responsive to said ship position and heading signals, for moving said first camera with respect to said background scene in accordance with predetermined ship motion characteristics so that said background image changes in appearance to said observer in accordance with steering and speed control inputs; and bow image shift computer means, connected to said ship motion computer means and to said sensor means, for providing said bow image positioning signals to said synthesizer means.

7. A ship conning simulator apparatus as defined in claim 6 and wherein:

said bow image shift computer provides said bow position signals ($D_4$) substantially in accordance with $D_4 = N\ D_3/D_2 \cos \phi$ where $N$ = a coordinate distance inherent in said ship position signals, $D_2$ = simulated distance from observer to ship bow, $D_3$ = lateral distance of point of view from simulated ship centerline, and $\phi$ = the angle by which the simulate ship heading deviates from a predetermined heading.

8. A ship conning simulator apparatus as defined in claim 7, and wherein:

said sensor means compriss potentiometer means adapted to provide a voltage signal that represents displacement of said observer's position and point of view to either side of said centerline; and said apparatus is further characterized by mechanical means for connecting said observer to said potentiometer means.

9. A ship conning simulator apparatus azs defined in claim 7, and wherein:

said sensor means comprises a plurality of photo-cells arranged in a horizontal row from side to side over said observer's position, said photo-cells being connected, through respective resistors having values representative of lateral distance from said centerline, to a summing resistor, and a source of voltage; and light source means carried by said observer and adapted to illuminate a portion of said photo-cells corresponding to the lateral position of said observer;

wherein said observer position signals are provided in the form of a voltage signal across said summing resistor.

* * * * *